(12) United States Patent
Takuda

(10) Patent No.: US 12,611,935 B2
(45) Date of Patent: Apr. 28, 2026

(54) ELECTRIFIED VEHICLE CONTROL DEVICE

(71) Applicant: TOYOTA JIDOSHA KABUSHIKI KAISHA, Toyota (JP)

(72) Inventor: Noritaka Takuda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/918,081

(22) Filed: Oct. 17, 2024

(65) Prior Publication Data

US 2025/0222777 A1     Jul. 10, 2025

(30) Foreign Application Priority Data

Jan. 10, 2024     (JP) ................................. 2024-001861

(51) Int. Cl.
*B60L 3/00*          (2019.01)
*B60K 1/00*          (2006.01)
*B60L 15/20*         (2006.01)

(52) U.S. Cl.
CPC .............. *B60L 3/0061* (2013.01); *B60L 15/20* (2013.01); *B60K 2001/006* (2013.01); *B60L 2240/423* (2013.01); *B60L 2240/425* (2013.01); *B60L 2240/642* (2013.01)

(58) Field of Classification Search
None
See application file for complete search history.

(56) References Cited

U.S. PATENT DOCUMENTS

| | | | | |
|---|---|---|---|---|
| 2008/0315814 A1* | 12/2008 | Takizawa | ................ | B60L 15/00 |
| | | | | 318/434 |
| 2019/0140578 A1* | 5/2019 | Lee | ........................ | B60W 20/12 |
| 2020/0119625 A1* | 4/2020 | Yang | .................... | H02H 7/0852 |
| 2022/0234568 A1* | 7/2022 | Takuma | ................ | B60W 20/12 |
| 2024/0187885 A1* | 6/2024 | Pabbishetty | .......... | H04W 48/18 |
| 2025/0343492 A1* | 11/2025 | Shouji | .................... | H02P 21/20 |
| 2026/0021705 A1* | 1/2026 | Masuda | ................ | B60L 3/0061 |

FOREIGN PATENT DOCUMENTS

JP          2014-060889 A       4/2014

* cited by examiner

*Primary Examiner* — Ryan Rink
(74) *Attorney, Agent, or Firm* — SoraIP, Inc.

(57) ABSTRACT

A control device for an electrified vehicle includes: an acquisition unit for acquiring a temperature of a motor which is a driving power source of an electrified vehicle and an index value indicating ease of temperature rise of the motor; an execution unit that executes a notification process for notifying a driver of electrified vehicle of a warning when a temperature of the motor is equal to or higher than a first temperature and lower than a second temperature; a limitation unit that limits a torque of the motor when a temperature of the motor is equal to or higher than the second temperature; and a setting unit that sets the first temperature to a lower temperature than a temperature when the index value is equal to or higher than a threshold value when the index value is equal to or higher than the threshold value.

3 Claims, 5 Drawing Sheets

ELECTRIFIED VEHICLE CONTROL DEVICE

CROSS-REFERENCE TO RELATED APPLICATION

This application claims priority to Japanese Patent Application No. 2024-001861 filed on Jan. 10, 2024, incorporated herein by reference in its entirety.

BACKGROUND

1. Technical Field

The present disclosure relates to an electrified vehicle control device.

2. Description of Related Art

There is a technology for suppressing excessive temperature rise of a motor that is a traveling power source of an electrified vehicle. For example, the driver is notified about an alert when the temperature of the motor is equal to or higher than a first temperature, and the torque of the motor is limited when the temperature of the motor is equal to or higher than a second temperature higher than the first temperature. When the torque of the motor is limited, a further temperature rise is suppressed (see, for example, Japanese Unexamined Patent Application Publication No. 2014-060889 (JP 2014-060889 A)).

SUMMARY

In a state in which the temperature of the motor rises easily, the temperature of the motor may be equal to or higher than the second temperature in a short period from the first temperature. In this case, the torque of the motor may be limited before the driver who has received the alert takes appropriate measures.

It is an object of the present disclosure to provide an electrified vehicle control device in which a period from an alert to a driver to limitation of a torque of a motor is secured.

The above object can be achieved by an electrified vehicle control device including:

an acquisition unit configured to acquire a temperature of a motor that is a traveling power source of an electrified vehicle and an index indicating likelihood of temperature rise of the motor;

an execution unit configured to execute a notification process for notifying a driver of the electrified vehicle about an alert when the temperature of the motor is equal to or higher than a first temperature and lower than a second temperature;

a limitation unit configured to limit a torque of the motor when the temperature of the motor is equal to or higher than the second temperature; and a setting unit configured to, when the index is equal to or higher than a threshold value, set the first temperature to a temperature lower than a temperature when the index is lower than the threshold value.

The index may be an ascending slope of a traveling road surface where the electrified vehicle travels.

The index may be a temperature of a coolant for cooling the motor.

According to the present disclosure, it is possible to provide the electrified vehicle control device in which the period from the alert to the driver to the limitation of the torque of the motor is secured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Electrified Vehicle

Figure 1:
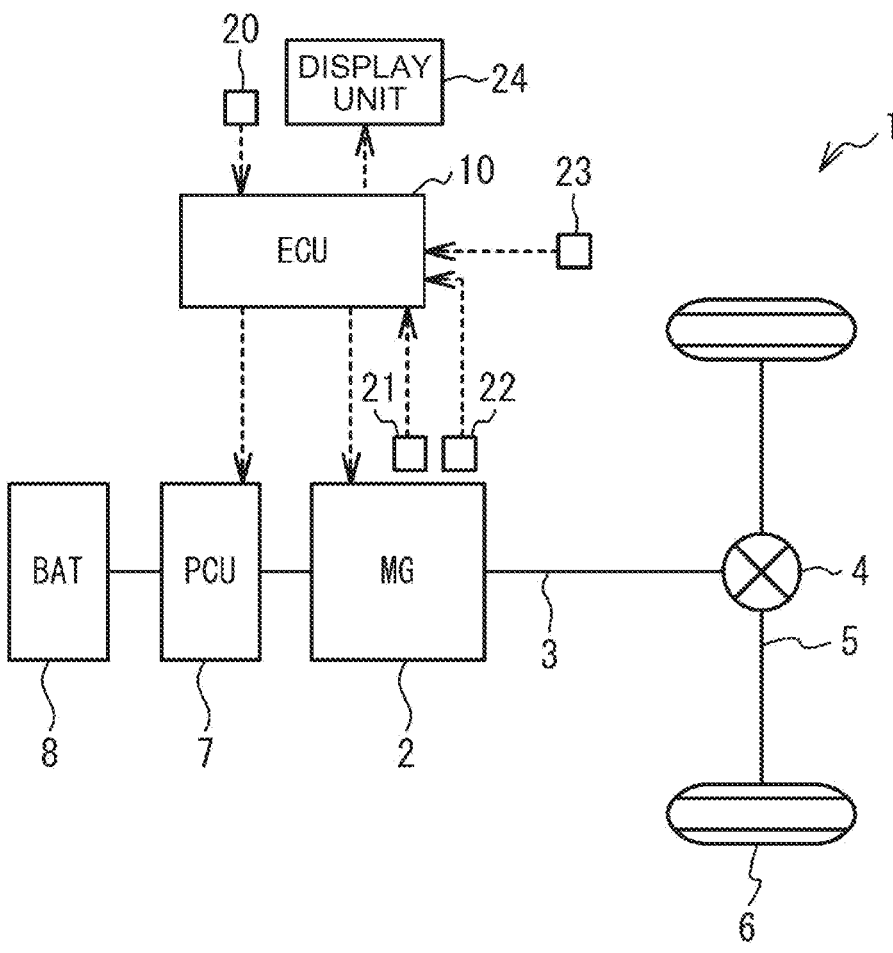
FIG. 1 is a schematic configuration diagram of an electrified vehicle.

FIG. 1 is a schematic configuration diagram of an electrified vehicle 1. Electrified vehicle 1 is a battery electric vehicle in which the motor 2 is mounted as a driving power source. Electrified vehicle 1 comprises a motor 2, a propeller shaft 3, a differential gear 4, a drive shaft 5, drive wheels 6, a Power Control Unit (PCU) 7, a battery 8, and an Electric Control Unit (ECU) 10.

The motor 2 functions as an electric motor that outputs torque by power supply. The motor 2 also functions as a generator that generates electric power when electrified vehicle 1 is braked. The electric power stored in the battery 8 is supplied to the motor 2 via PCU 7. The electric power generated by the motor 2 is supplied to the battery 8 via PCU 7. ECU 10 controls PCU 7 to adjust the electric power exchanged between the motor 2 and the battery 8.

The motor 2 is connected to the drive wheels 6 via a propeller shaft 3, a differential gear 4, and a drive shaft 5. When the torque of the motor 2 is transmitted to the drive wheels 6, electrified vehicle 1 travels.

ECU 10 includes a Central Processing Unit (CPU), Random Access Memory (RAM), Read Only Memory (ROM), and a storage device, and performs various kinds of control by executing programs stored in a ROM or a storage device. ECU 10 is an exemplary electrified vehicle control device, and functionally realizes an acquisition unit, an execution unit, a limitation unit, and a setting unit, which will be described in detail later.

An ignition switch 20, a temperature sensor 21, a water temperature sensor 22, and a gradient sensor 23 are electrically connected to ECU 10. The ignition switch 20 detects an on-off state of the ignition. The temperature sensor 21 detects a temperature of the motor 2 (hereinafter, referred to as a motor temperature MT). The water temperature sensor 22 detects a temperature (hereinafter, referred to as a water temperature WT) of the coolant that cools the motor 2. The gradient sensor 23 detects the ascending slope UG [%] of the traveling road surface. The display unit 24 is electrically connected to ECU 10. The display unit 24 is controlled by a ECU 10 and is provided on an instrument panel of the vehicle.

Motor Protection Control

Figure 2:
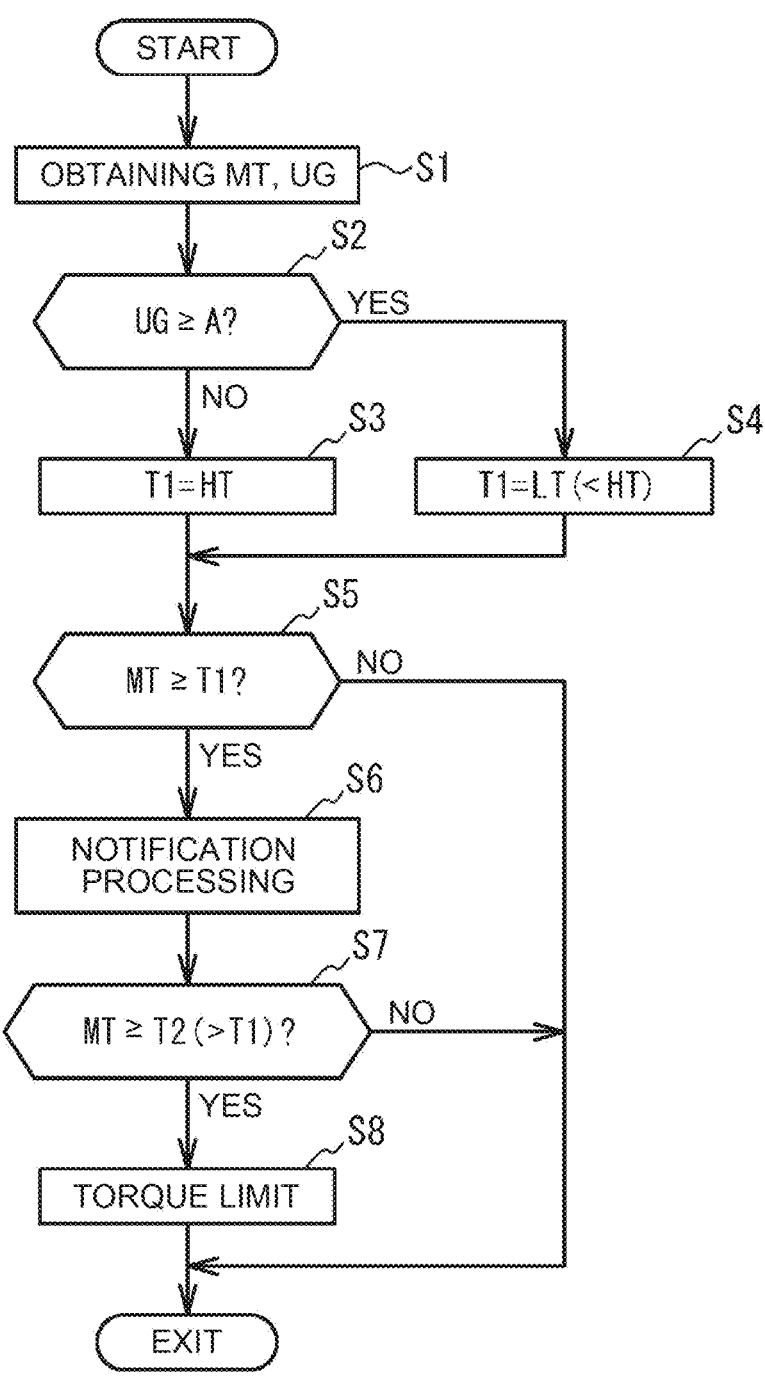
FIG. 2 is a flow chart illustrating motor protective control.

FIG. 2 is a flow chart illustrating motor protective control. This control is repeatedly executed during the ignition-on. ECU 10 acquires the motor temperature MT and the ascending slope UG by the temperature sensor 21 and the gradient sensor 23 (S1). The ascending slope UG is an exemplary index indicating easiness of temperature rise of the motor 2. This is because, as the ascending slope UG increases, the torque of the motor 2 increases, the electric power supplied to the motor 2 increases, and the temperature of the motor 2 tends to increase. S1 is an exemplary process executed by the acquisition unit.

ECU 10 then determines whether the ascending slope UG is greater than or equal to the gradient threshold A (S2). The gradient threshold A is a positive value. Here, when the ascending slope UG is equal to or greater than the gradient threshold A, the torque of the motor 2 increases and the motor temperature MT increases more easily than when the ascending slope UG is less than the gradient threshold A. When S2 is No, ECU 10 sets the first temperature T1, which will be described later, to the high temperature HT (S3). If S2 is Yes, ECU 10 sets the first temperature T1 to a low temperature LT (S4). The low temperature LT is at a temperature lower than the high temperature HT. That is, when the ascending slope UG is equal to or greater than the gradient threshold A, the first temperature T1 is set to a lower temperature than when the ascending slope UG is less than the gradient threshold A. S4 from S2 is an exemplary process executed by the setting unit.

After performing S3 or S4, ECU 10 determines whether the motor temperature MT is greater than or equal to the first temperature T1 (S5). If S5 is No, this control ends. When S5 is Yes, ECU 10 executes a notification process of notifying the driver of the warning (S6). For example, ECU 10 causes the display unit 24 to display a warning that the motor 2 may be torque-limited and prompts the vehicle to stop. When the driver stops electrified vehicle 1 in accordance with the warning, further temperature rise of the motor 2 is suppressed, and torque-limiting of the motor 2 described later is avoided. Note that the notification method is not limited to this. For example, the above warning may be notified by sound through a speaker such as an audio system or a navigation system of a vehicle. S6 is an exemplary process executed by the execution unit.

Next, ECU 10 determines whether the motor temperature MT is equal to or higher than the second temperature T2 (S7). The second temperature T2 is a temperature higher than the first temperature T1, that is, a temperature higher than the high temperature HT or the low temperature LT. If S7 is No, this control ends. If S7 is Yes, ECU 10 will limit the torque of the motor 2 (S8). The torque limit may be realized by changing the upper limit torque that can be output by the motor 2 to a smaller value. Further, the limit of the torque may be realized by multiplying the required torque to the motor 2 by a coefficient less than 1 and changing the required torque to a smaller value. Other torque limits may be realized by limiting the current value applied to the motor 2 to a predetermined value or less, or may be realized by limiting the rotational speed of the motor 2. This suppresses the temperature rise of the motor 2. S2 is an exemplary process executed by the limitation unit.

Figure 3A:
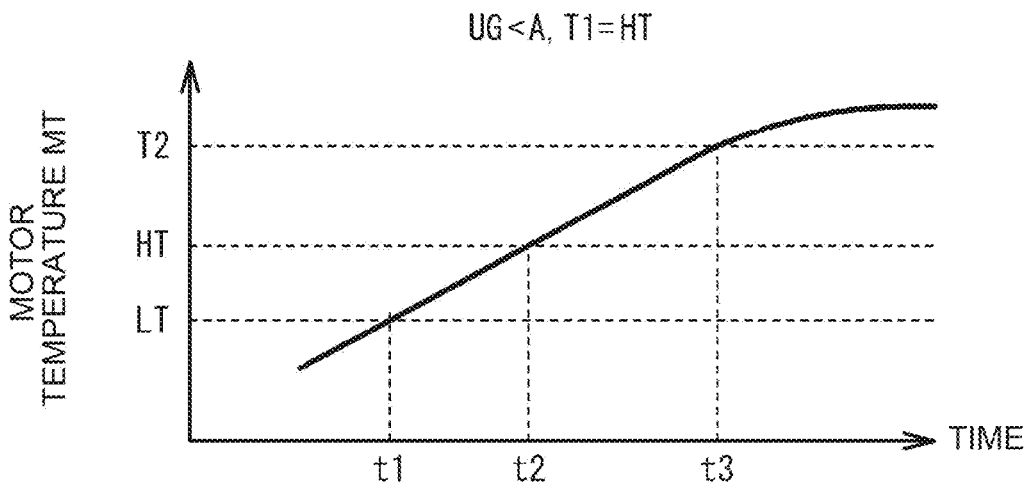
FIG. 3A is a timing chart showing an exemplary transition of the motor temperature.
Figure 3B:
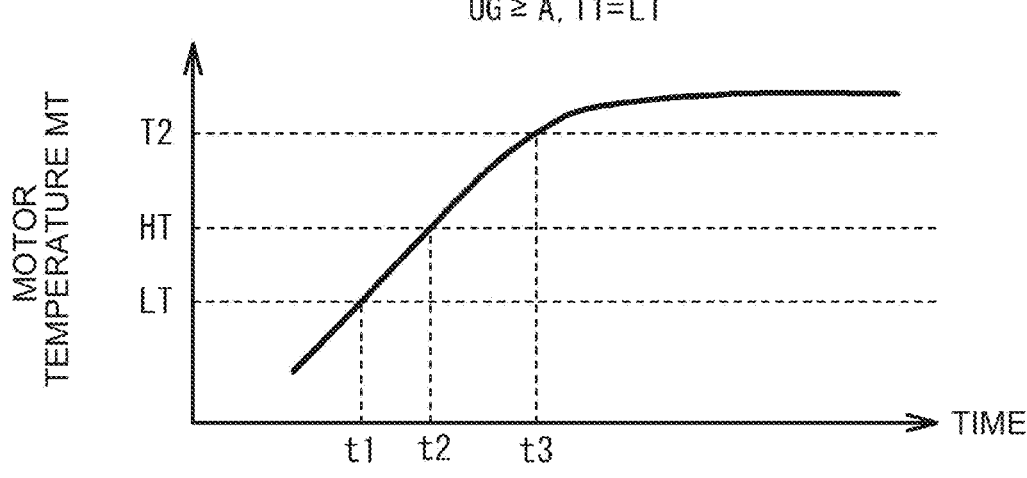
FIG. 3B is a timing chart showing another example of transition of motor temperature.

In FIGS. 3A and 3B, it is a timing diagram illustrating the transition of the motor temperature MT. FIG. 3A illustrates the transition of the motor temperature MT when the ascending slope UG is less than the gradient threshold A and the first temperature T1 is set to the high temperature HT. As shown in FIG. 3A, when the motor temperature MT becomes equal to or higher than the low temperature LT (time t1) and the motor temperature MT becomes equal to or higher than the high temperature HT, a warning is notified to the driver (time t2). Thereafter, the motor temperature MT becomes equal to or higher than the second temperature T2, and the torque of the motor 2 is limited (time t3).

FIG. 3B illustrates the transition of the motor temperature MT when the ascending slope UG is equal to or greater than the gradient threshold A and the first temperature T1 is set to the low temperature LT. As shown in FIG. 3B, a warning is notified to the driver when the motor temperature MT becomes equal to or higher than the high temperature HT (time t2) when the motor temperature MT becomes equal to or higher than the low temperature LT (time t1). Thereafter, the motor temperature MT becomes equal to or higher than the second temperature T2, and the torque of the motor 2 is limited (time t3). In this way, the time from the warning (time t1) to the torque limit (time t3) is secured. Thus, the driver can take appropriate measures such as stopping the vehicle before the torque limit.

ECU 10 may execute a process of increasing the braking force of electrified vehicle 1 together with the warning. The increase in the braking force may be realized, for example, by performing correction to increase the target braking force. Increasing the braking force of electrified vehicle 1 prior to the torque limit prevents electrified vehicle 1 from retracting on the ascending slope during the torque limit. When the vehicle is traveling in the autonomous driving mode, electrified vehicle 1 may be decelerated or stopped together with the warning.

Modification of Motor Protection Control

Figure 4:
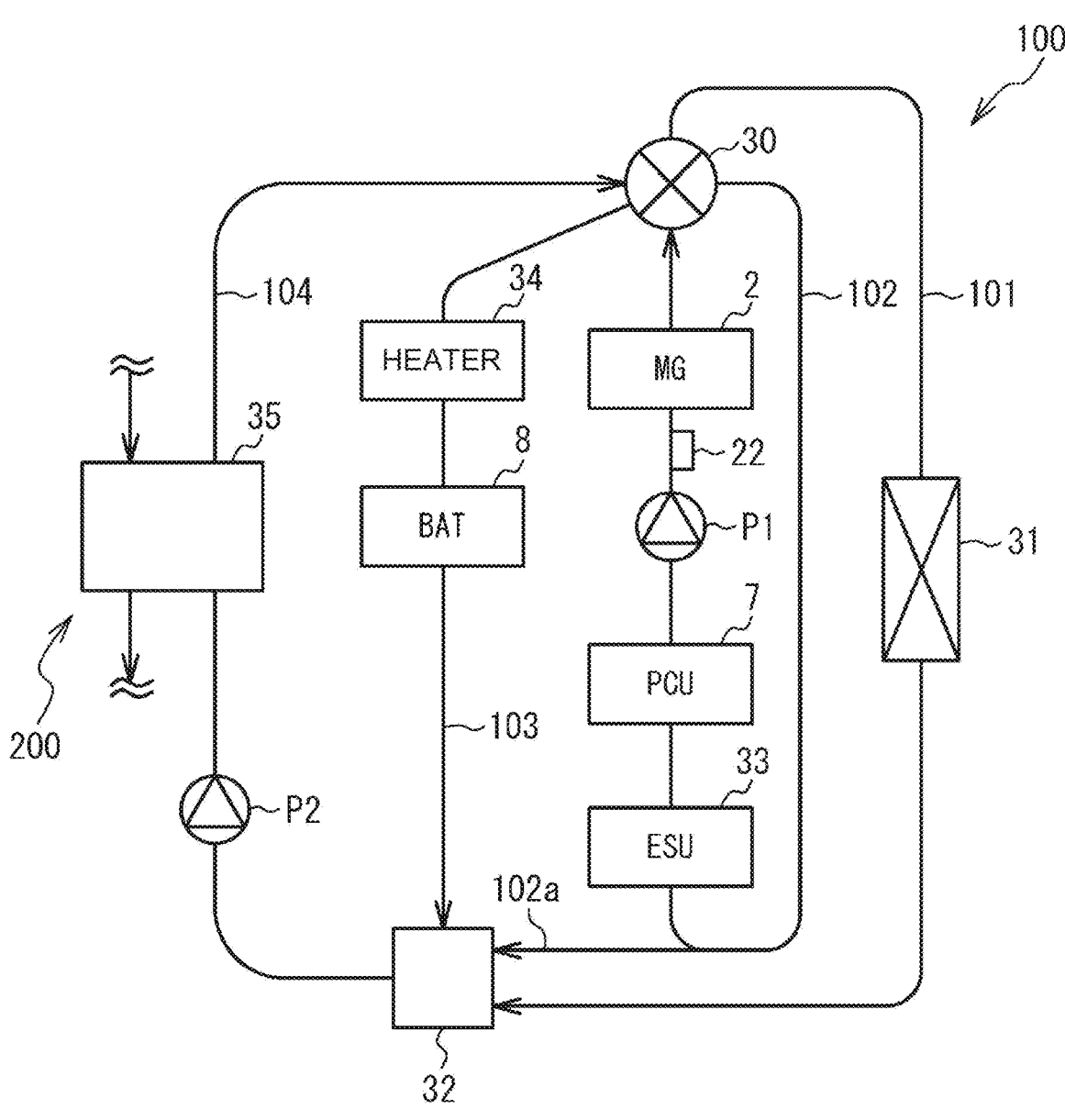
FIG. 4 is an illustration of a refrigeration circuit.

Next, a modification of the motor protection control will be described. In the present modification, the water temperature WT of the coolant for cooling the motor 2 is used. Therefore, a cooling circuit for cooling the motor 2 will be described. FIG. 4 is an exemplary diagram of a cooling circuit 100. Cooling circuit 100 includes paths 101, 102, 103, and 104. The path 101 allows coolant to flow from the five-way valve 30 to the reservoir tank 32 via the radiator 31. The path 102 allows coolant to flow from the five-way valve 30 to the five-way valve 30 again via Electricity Supply Unit (ESU) 33, PCU 7, and the motor 2. A water pump P1 is disposed between PCU 7 on the path 102 and the motor 2. A water temperature sensor 22 is provided between water pump P1 on the path 102 and the motor 2. The position of the water temperature sensor 22 is not limited to this and may be on the path 102. The path 102a branches from the upstream side of ESU 33 of the path 102. The path 102a flows the coolant to the reservoir tank 32. The path 103 allows coolant to flow to the reservoir tank 32 via the heater 34 and the battery 8. The path 104 allows coolant to flow through the five-way valve 30 via the chiller 35. A water pump P2 is disposed between the reservoir tank 32 and the chiller 35 on the path 104.

The radiator 31 promotes heat dissipation of the coolant. The reservoir tank 32 removes air bubbles in the coolant. ESU 33 controls the charging of the battery 8 by the electric power of the external power source. The heater 34 raises the temperature of the battery 8 by heating the coolant, as necessary. The chiller 35 is thermally connected between cooling circuit 100 and the heat pump circuit 200.

Figure 5:
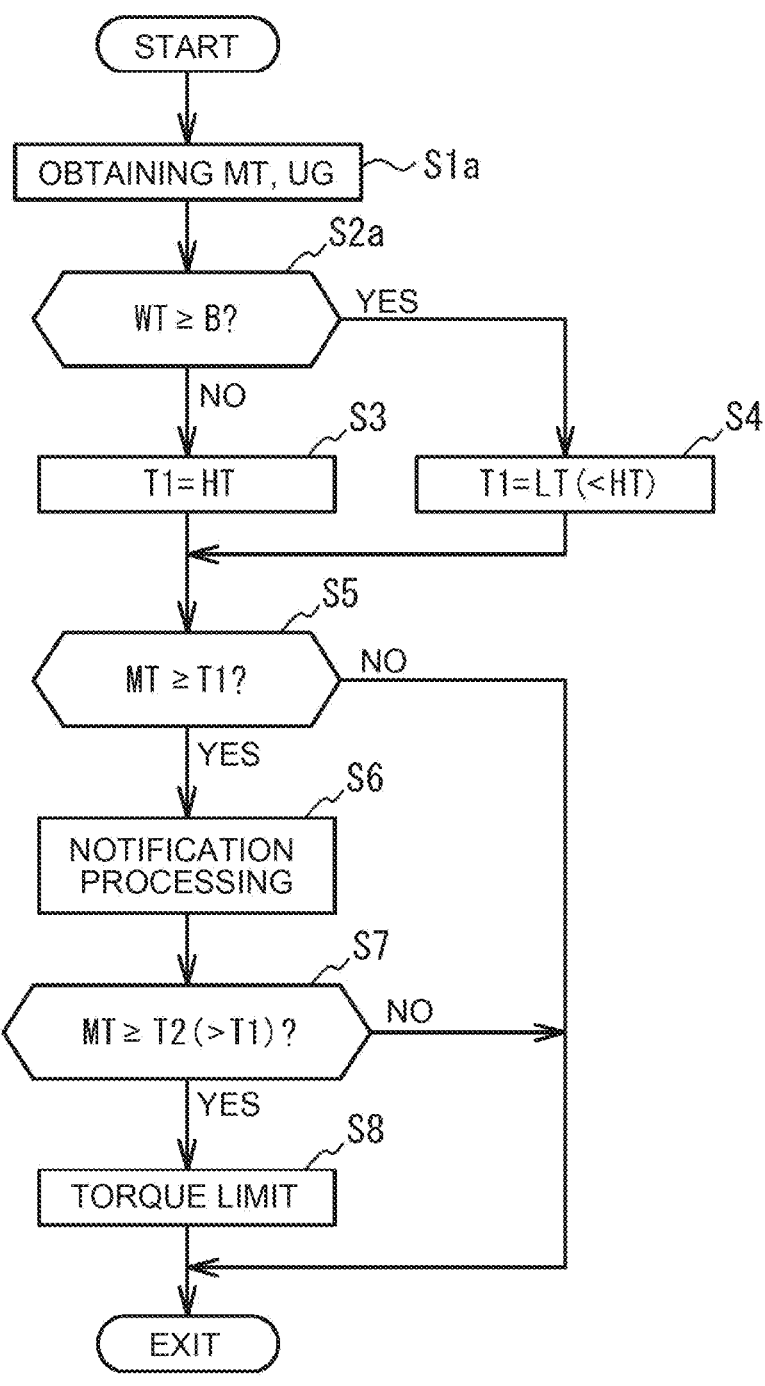
FIG. 5 is a flow chart illustrating a variation of the motor protective control.

FIG. 5 is a flow chart illustrating a variation of the motor protective control. ECU 10 acquires the motor temperature MT and the water temperature WT by the temperature sensor 21 and the water temperature sensor 22 (S1a). The water temperature WT is an exemplary index indicating the easiness of temperature increase of the motor 2. This is because the higher the water temperature WT, the lower the cooling effectiveness of the coolant, and the higher the temperature of the motor 2 is. S1a is an exemplary process executed by the acquisition unit.

Next, ECU 10 determines whether the water temperature WT is equal to or higher than the water temperature threshold B (S2*a*). Here, when the water temperature WT is equal to or higher than the water temperature threshold B, the cooling effectiveness by the coolant is lower and the motor temperature MT is more likely to increase than when the water temperature WT is lower than the water temperature threshold B. If S2*a* is No, ECU 10 sets the first temperature T1 to a high temperature HT (S3). If S2*a* is Yes, ECU 10 sets the first temperature T1 to a low temperature LT (S4). That is, when the water temperature WT is equal to or higher than the water temperature threshold B, the first temperature T1 is set to a lower temperature than when the water temperature WT is lower than the water temperature threshold B. S2*a*, S3 and S4 are exemplary processes executed by the setting unit. Thereafter, the processes after S5 are executed. Thus, when the water temperature WT is high, the time from the warning to the torque limit can be secured, and the driver can take appropriate measures such as stopping the vehicle prior to the torque of the motor 2 being limited.

In the above embodiment, the ascending slope UG is described as an example of an index indicating ease of temperature rise of the motor 2. In the above modification, the water temperature WT is explained as an index. For example, both the ascending slope UG and the water temperature WT may be used as the index. For example, when the ascending slope UG is less than the gradient threshold A and the water temperature WT is less than the water temperature threshold B, the first temperature T1 may be set to the high temperature HT, and otherwise, the first temperature T1 may be set to the low temperature LT. In addition, when the ascending slope UG is less than the gradient threshold A and the water temperature WT is less than the water temperature threshold B, the first temperature T1 may be set to the high temperature HT. When the ascending slope UG is equal to or higher than the gradient threshold A or the water temperature WT is equal to or higher than the water temperature threshold B, the first temperature T1 may be set to the low temperature LT. When the ascending slope UG is equal to or higher than the gradient threshold A and the water temperature WT is equal to or higher than the water temperature threshold B, the first temperature T1 may be set to a lower temperature.

In the above embodiment, an electrified vehicle 1 that is a battery electric vehicle has been described as an example, but the present disclosure is not limited thereto. For example, electrified vehicle may be a hybrid electric vehicle including an engine and a motor as a driving power source.

Although the embodiments of the present disclosure have been described in detail above, the present disclosure is not limited to such specific embodiments, and various modifications and changes can be made within the scope of the gist of the present disclosure described in the claims.

What is claimed is:

1. An electrified vehicle control device comprising:
   an acquisition unit configured to acquire a temperature of a motor that is a traveling power source of an electrified vehicle and an index indicating likelihood of temperature rise of the motor;
   an execution unit configured to execute a notification process for notifying a driver of the electrified vehicle about an alert when the temperature of the motor is equal to or higher than a first temperature and lower than a second temperature;
   a limitation unit configured to limit a torque of the motor when the temperature of the motor is equal to or higher than the second temperature; and
   a setting unit configured to, when the index is equal to or higher than a threshold value, set the first temperature to a temperature lower than a temperature when the index is lower than the threshold value.

2. The electrified vehicle control device according to claim 1, wherein the index is an ascending slope of a traveling road surface where the electrified vehicle travels.

3. The electrified vehicle control device according to claim 1, wherein the index is a temperature of a coolant for cooling the motor.

* * * * *